(12) United States Patent
Betzen

(10) Patent No.: US 6,779,490 B1
(45) Date of Patent: Aug. 24, 2004

(54) ELECTRODE SEPARATOR FOR DEER REPELLENT DEVICE

(76) Inventor: Keith M. Betzen, P.O. Box 5604, Bloomington, IN (US) 47407-5604

( * ) Notice: Subject to any disclaimer, the term of this patent is extended or adjusted under 35 U.S.C. 154(b) by 370 days.

(21) Appl. No.: 09/550,555

(22) Filed: Apr. 17, 2000

(51) Int. Cl.$^7$ .............................................. A01K 37/00
(52) U.S. Cl. ...................................................... 119/712
(58) Field of Search ................................ 119/712, 908

(56) References Cited

U.S. PATENT DOCUMENTS

| | | | | |
|---|---|---|---|---|
| 517,591 A | * | 4/1894 | Robinson | 174/152 G |
| 922,377 A | | 5/1909 | Ames | |
| 4,580,767 A | * | 4/1986 | Zimmerman | 256/10 |
| 4,630,571 A | | 12/1986 | Palmer | 119/29 |
| 5,605,116 A | * | 2/1997 | Kim et al. | 119/720 |
| 5,894,818 A | * | 4/1999 | Betzen | 119/712 |
| 6,014,951 A | * | 1/2000 | Betzen | 119/712 |

FOREIGN PATENT DOCUMENTS

| | | |
|---|---|---|
| CH | 82560 | 10/1919 |
| FR | 440270 | 2/1912 |

OTHER PUBLICATIONS

Havahart Electronic Repellent For Deer Instructions—Printed from internet www.havahart.com/nuisance/deer7.20Tips htm—2001.

Advertising brochure from Wireless Deer Fence—Betzen Mfg Copyright 2000.

* cited by examiner

Primary Examiner—Charles T. Jordan

(57) ABSTRACT

In order to deter pest animals, particularly deer, from a protected area, a portable, wireless, shock producing, animal repelling and training device is provided having two or more bare electrodes and having an electrode separator which maintains the electrodes in close proximity to each other and insulated from each other, while allowing full exposure of the electrodes to the target animal and while greatly reducing the chances that the device will be discharged by the electrodes contacting each other or by precipitation. The animal control device is deployed such that the target pest animals in the protected area will be attracted to touch the device and so will contact the electrodes, receive an electric shock, and be frightened from the area. Target animals will then continue to avoid the protected area because of a scarecrow effect provided by the presence of the device.

2 Claims, 1 Drawing Sheet

ELECTRODE SEPARATOR FOR DEER REPELLENT DEVICE

FIELD OF THE INVENTION

This invention relates to shock-producing, animal repelling and training devices; particularly to a portable, wireless, shock-producing, animal repelling and training device which has the crisscrossing electrodes maintained in position by an electrode separator.

BACKGROUND OF THE INVENTION

The control of damage caused by wild and domestic animals is an ongoing challenge. Animal repelling and training devices which deliver an electric shock have proven to be very effective in altering animal behavior and the use of shock-producing devices results in immediate retreat and long term avoidance behaviors.

Various electrode configurations have been described for portable, shock-producing, animal deterrent devices.

U.S. Pat. No. 922,377 to Ames (1909), French Patent 440,270 to Calvert (1912) and Swiss Patent 82,560 to Baumann (1919), show animal extermination devices with the electrodes being arranged essentially in the same plane.

U.S. Pat. No. 4,630,571 to Palmer (1986) shows an animal training device with the outer conductive case of the device being one electrode and the stake to the earth being the other.

U.S. Pat. No. 5,894,818 to Betzen (1999) describes a baited, shock-producing, animal repelling and training device in which the deterrent voltage maintained across the electrodes is stored in a capacitor. The innovation of using a capacitor to store the deterrent energy in a baited animal control device, as described by Betzen (1999), allowed the creation of a small, easily portable, wireless device which delivers a single pulse of high voltage energy with a very low amperage, a very short discharge time and a short current path through the target animal attracted to the bait used on the device. The electrodes of the device described by Betzen (1999) are short projections above the surface of the device.

Subsequent prototypes and commercial models of Betzen's device have used two crisscrossing semicircular electrodes projecting from the top of the protective housing.

None of these prior art devices provide an electrode arrangement which completely surrounds the scent source for use in a baited, shock-producing, deer repellent device.

U.S. Pat. No. 6,014,951 to Betzen (2000) shows an improved electrode arrangement which more completely surrounds the scent source in a deer repellent device and which therefore increases the chances of the target animal contacting the electrodes. The electrodes as described by Betzen (2000) consist of a positive, circular electrode and a negative, circular electrode which are opposed at ninety degrees to enclose the scent dispenser. These electrodes are made from 0.020" stainless steel wire and they are separated at the top by a small air space.

The configuration of electrodes as described by Betzen (2000) has proven to be very effective, but various problems have become evident which have not allowed this device to perform to its full potential. One problem is that the electrodes can be easily pushed into contact with each other when a deer touches the device and so the device may be discharged without the deer receiving a shock. Another problem is that the electrodes often become fused when they contact each other and the device is rendered ineffectual until the electrodes are broken free. In addition, during times of precipitation, a drop of water passing through or hanging in the small space between the electrodes will discharge the device. Also, since the electrodes are made of small diameter wire, the relatively large loop of wire as described by Betzen (2000) is subject to distortion. It has also been observed that small insects will sometimes enter the air space between the electrodes and stick there after they are electrocuted. Finally, even the small air space left between the electrodes requires that the electrodes be at different heights and this reduces the chances of the target animal contacting both electrodes simultaneously.

SUMMARY OF THE INVENTION

It is evident that all of the prior art devices disclosed herein suffer from various disadvantages which limit their efficiency.

Accordingly, various objects and features of the device of the present invention are described subsequently which eliminate many problems associated with the prior art devices.

A principal object of the present invention is to provide an electrode separating means to work with a crisscrossing electrode configuration as described by Betzen (2000) to make the electrodes work more effectively and efficiently. The innovation of the present invention improves the technology described by Betzen (2000) and the present invention has all of the advantages described by Betzen (2000), but without the disadvantages.

Another object of the present invention is to provide an electrode separating means to prevent the electrodes from being pushed into contact with each other when the deer contacts the device and so to prevent the device from becoming discharged without the deer receiving a shock.

Another object of the present invention is to provide an electrode separating means to avoid contact between the electrodes and so to prevent the electrodes from becoming fused when they contact each other rendering the device ineffectual until the electrodes are broken free.

Another object of the present invention is to provide an electrode separating means to prevent the device from becoming discharged during times of precipitation by a drop of water passing through or hanging in the small space between the electrodes.

Another object of the present invention is to provide an electrode separating means to support the electrodes and so to reduce potential distortion of the small diameter wire electrodes.

Another object of the present invention is to provide an electrode separating means to reduce the small space between the crisscrossing electrodes and thereby allow the electrodes to be at essentially the same height and so increase the chances of the target animal contacting both electrodes simultaneously.

Another object of the present invention is to provide an electrode separating means which allows full exposure of the electrodes to the target animal.

Therefore, it can be seen that the combination of features incorporated into the device of the present invention solves prior problems associated with the crisscrossing electrodes used on this type of animal repelling and training device. It can also be seen that the device of the present invention produces new and unobvious results that have not been produced by the prior art.

Additional features will become apparent from a consideration of the ensuing drawings and description.

DESCRIPTION OF THE PREFERRED EMBODIMENTS

The electrode separator means of the present invention may vary widely in its configuration and composition. The preferred embodiment described herein provides a simple method to separate and support the electrodes for a portable, shock-producing, animal repellent device.

Figure 1:
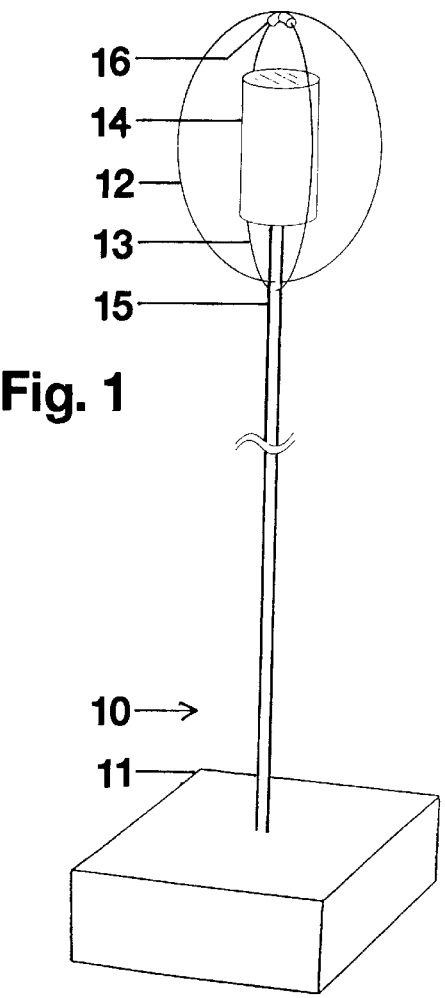
FIG. 1 shows a perspective view of a typical embodiment of the present invention.

FIG. 1 shows a typical embodiment of a portable, shock-producing, animal repellent device 10 which consists of a field unit with a protective housing 11 to contain the batteries and electronic components which maintain a predetermined voltage across the electrodes. The unit will have a top, circular electrode 12 and a bottom, circular electrode 13 which are opposed at ninety degrees to enclose the scent dispenser 14 so that the target pest animal attracted to the scent will touch the electrodes and receive an electric shock. The field unit has a stem 15 as support means to position and to support the components. The electrode separator 16 holds the electrodes in the desired position, allowing the electrodes to be in close proximity to each other while being insulated from each other and while allowing full exposure of the electrodes to the target animal. The electrodes are made from 0.020" stainless steel wire.

Figure 2:
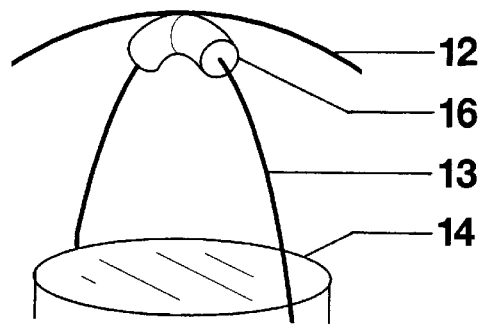
FIG. 2 shows a close-up view of the electrode separator.

FIG. 2 shows a detailed view of the electrode separator 16 holding the top electrode 12, and the bottom electrode 13 which surround the scent dispenser 14. The electrode separator 16 can be as simple as a short length of insulation on the bottom electrode with the top electrode resting on, or attached to, the top of the insulation. A suitable insulating product is Insul-grip HS-105 PVC heat shrink tubing in 3/64" size.

Figure 3:
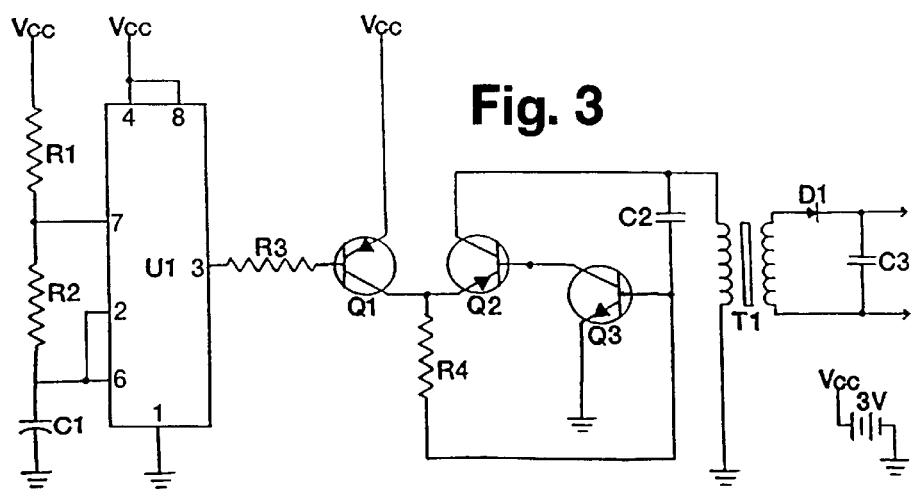
FIG. 3 shows a schematic drawing of a typical circuit used in the device.

FIG. 3 shows a schematic of a circuit that can be used to charge capacitor, C3, to about 360 volts when the battery voltage is about 3.1 volts and when transformer, T1, has a primary/secondary ratio of 1/138 with 27 primary windings. T1 has a 20 milliwatt power rating, a primary impedance of 8 ohms, and is operating in this circuit at 14 Khz. The values of the resistors are: R1=2.7M, R2=10K, R3=470 and R4=33K. The values of the capacitors are: C1=470 uf, 10 volt, electrolytic; C2=0.047 uf, 10 volt, ceramic; C3=1.5 uf, 400 volt, metalized polyester. The types of the transistors are: Q1 and Q2 are 2N2907 and Q3 is a 2N2222. The diode, D1, is a 1N4006. The timer, U1, is a ICM7555CN. The circuit shown in FIG. 3, with these component values will charge the capacitor for 3.26 seconds with an interval of 14.7 minutes between charging pulses. The charging time, the interval, the capacitance of C3 and the voltage to which C3 is charged are all variable and can be adjusted to each situation and species. The power supply for this circuit is 2 AA batteries in series. All components are 1/4 watt, and all components are readily available, except the transformer, which is custom made for each application.

The description of the present invention contained herein is an exemplification of typical embodiments and is considered as illustrative only of the principles of this invention. Although this description contains various specificities, these should not be construed as limitations on the scope of this invention. The electrode separator device of the present invention can be made with various materials and shapes. This electrode separator device may be used with various numbers and shapes of electrodes. Other changes in size, color, materials, shape, form, function and manner of operation, assembly and use, are deemed readily apparent and do not depart from the scope of the present invention which is limited only by the following claims and their legal equivalents.

What is claimed is:

1. A shock-producing, animal repelling and training device comprising a field unit with a protective housing and having support means to position said device in a protected area and to support a plurality of crisscrossing, bare electrodes arranged so that a target animal touching said electrodes will complete the circuit between said electrodes and so receive an electric shock, and with said device having a means to maintain a predetermined voltage across said electrodes, with the improvement comprising said shock-producing, animal repelling and training device having an electrode separator to hold said crisscrossing electrodes in place while preventing contact between said electrodes, while allowing full exposure of said electrodes to said target animal;

whereby said animal repelling and training device functions as a portable, wireless, shock-producing, animal repelling and training device to deter said target animal from said protected area with said device having said crisscrossing electrodes being held in position by said electrode separator while being insulated from each other.

2. A method of repelling and training target animals comprising the steps of:

(a) deploying a shock-producing, animal repelling and training device comprising a field unit with a protective housing and having support means to position said device In a protected area and to support a plurality of crisscrossing, bare electrodes arranged so that a target animal touching said electrodes will complete the circuit between said electrodes and so receive an electric shock, and with said device having a means to maintain a predetermined voltage across said electrodes, with the improvement comprising said shock-producing, animal repelling and training device having an electrode separator to hold said crisscrossing electrodes in place while preventing contact between said electrodes, while allowing full exposure of said electrodes to said target animal;

whereby said animal repelling and training device functions as a portable, wireless, shock-producing, animal repelling and training device to deter said target animal from said protected area with said device having said crisscrossing electrodes being held in position by said electrode separator while being insulated from each other, and (b) maintaining said animal repelling and training devices having said electrode separator in said protected area to provide a scarecrow effect and so train said animals to continue to avoid said area.

* * * * *